United States Patent
Jackson (10) Patent No.: US 10,968,558 B2
(45) Date of Patent: Apr. 6, 2021

(54) INTEGRATED MOTOR AND GEARBOX DRIVE SYSTEM FOR A WASHING MACHINE

(71) Applicant: Fisher & Paykel Appliances Limited, Auckland (NZ)

(72) Inventor: Russell Joseph Jackson, Auckland (NZ)

(73) Assignee: FISHER & PAYKEL APPLIANCES LIMITED

( * ) Notice: Subject to any disclaimer, the term of this patent is extended or adjusted under 35 U.S.C. 154(b) by 113 days.

(21) Appl. No.: 16/275,626

(22) Filed: Feb. 14, 2019

(65) Prior Publication Data
US 2019/0249351 A1 Aug. 15, 2019

(51) Int. Cl.
| | | |
|---|---|---|
| *D06F 37/40* | (2006.01) | |
| *F16H 3/64* | (2006.01) | |
| *D06F 23/04* | (2006.01) | |
| *D06F 37/30* | (2020.01) | |
| *D06F 35/00* | (2006.01) | |

(52) U.S. Cl.
CPC .............. *D06F 37/40* (2013.01); *D06F 23/04* (2013.01); *D06F 37/30* (2013.01); *F16H 3/64* (2013.01); *D06F 35/007* (2013.01); *F16H 2200/0034* (2013.01); *F16H 2200/2005* (2013.01); *F16H 2200/2033* (2013.01)

(58) Field of Classification Search
CPC .......... D06F 37/30; D06F 37/40; D06F 23/04; F16H 3/64
See application file for complete search history.

(56) References Cited

U.S. PATENT DOCUMENTS

| | | | |
|---|---|---|---|
| 1,649,050 A | 11/1927 | Winch | |
| 2,968,174 A | 1/1961 | Bell et al. | |
| 4,232,536 A | 11/1980 | Koseki et al. | |
| 4,848,105 A | 7/1989 | O'Connell et al. | |
| 4,862,770 A | 9/1989 | Smith | |
| 4,868,944 A | 9/1989 | Ishino et al. | |
| 4,910,979 A | 3/1990 | Burk et al. | |
| 4,918,344 A | 4/1990 | Chikamori et al. | |

(Continued)

FOREIGN PATENT DOCUMENTS

| | | |
|---|---|---|
| CN | 201062322 | 5/2008 |
| CN | 101824731 | 9/2010 |

(Continued)

*Primary Examiner* — Joseph L. Perrin
(74) *Attorney, Agent, or Firm* — Clark Hill PLC; James R. Foley (57) ABSTRACT

A drive system (21), for use in a washing machine (10), that includes a motor (23) and a planetary gearbox (26) having an outer casing (29) rotatably mounted by bearings (31A and 31B) between a tub (13) of the washing machine and the motor. A clutch (38) is selectively operable to engage the gears in a first mode to connect an input shaft (25) to drive at least a first output shaft (15) without speed reduction and, in a second mode, to drive the first output shaft at a controlled and reduced speed in one direction while simultaneously driving a second output shaft (18) at a second controlled and reduced speed the opposite rotational direction. The first gearbox output shaft (15) and the outer casing (29) are permanently rotationally fixed together in both first and second modes.

19 Claims, 7 Drawing Sheets

(56) References Cited

U.S. PATENT DOCUMENTS

| | | | |
|---|---|---|---|
| 5,473,916 A | 12/1995 | Ye | |
| 5,680,778 A * | 10/1997 | Seo | D06F 37/40 68/23.7 |
| 6,176,108 B1 * | 1/2001 | Bae | D06F 37/40 68/23.7 |
| 7,197,783 B2 | 4/2007 | Wilson et al. | |
| 7,475,445 B2 | 1/2009 | Chai et al. | |
| 8,616,028 B2 | 12/2013 | Kim et al. | |
| 2002/0007653 A1 * | 1/2002 | Koshiga | D06F 37/304 68/23.7 |
| 2005/0166643 A1 * | 8/2005 | Cho | D06F 39/083 68/12.02 |
| 2012/0302392 A1 | 11/2012 | Liu | |
| 2014/0323264 A1 | 10/2014 | Yen | |
| 2017/0029998 A1 * | 2/2017 | Leany | D06F 17/08 |
| 2017/0044705 A1 * | 2/2017 | Kim | D06F 37/12 |
| 2017/0247828 A1 * | 8/2017 | Tsuji | D06F 17/10 |
| 2017/0284007 A1 * | 10/2017 | Hirota | D06F 37/304 |
| 2018/0298539 A1 * | 10/2018 | Kim | D06F 39/085 |
| 2018/0347096 A1 * | 12/2018 | Yoneda | D06F 37/40 |
| 2018/0347097 A1 * | 12/2018 | Yoneda | D06F 37/306 |
| 2018/0371670 A1 * | 12/2018 | Tanikoshi | D06F 37/06 |
| 2019/0017211 A1 * | 1/2019 | Kim | H02K 7/108 |

FOREIGN PATENT DOCUMENTS

| | | |
|---|---|---|
| CN | 102619069 | 8/2012 |
| CN | 202519478 | 11/2012 |
| CN | 202519479 | 11/2012 |
| CN | 102337653 | 5/2015 |
| CN | 204794550 | 11/2015 |
| CN | 105156514 | 12/2015 |
| CN | 105200719 | 12/2015 |
| CN | 205823973 | 12/2016 |
| CN | 206157407 | 5/2017 |
| CN | 105019192 | 6/2017 |
| DE | 102014003958 | 10/2015 |
| EP | 1759047 | 11/2012 |
| EP | 2527686 | 11/2012 |
| GB | 2285063 | 6/1995 |
| JP | 2010127972 | 6/2010 |
| KR | 20170082437 | 7/2017 |
| WO | 2016153160 | 9/2016 |
| WO | 2017119774 | 7/2017 |

* cited by examiner

INTEGRATED MOTOR AND GEARBOX DRIVE SYSTEM FOR A WASHING MACHINE

CROSS-REFERENCE TO RELATED APPLICATIONS

This application claims the benefit of NZ Application No. 739836, filed Feb. 14, 2018, the contents of which is incorporated herein in its entirety.

FIELD OF INVENTION

The invention relates to a drive system for a washing machine.

BACKGROUND TO THE INVENTION

A typical domestic washing machine may comprise an outer tub, an inner basket (i.e., drum or spin tub or wash basket) rotatably mounted inside the outer tub (i.e., water container), and a first shaft centrally connected to the basket for supporting the basket while transmitting a drive force from a motor. It may further comprise an agitation device rotatably mounted inside the basket supported by a second shaft coaxial with the first shaft.

A washing machine drive system of this general type is disclosed in U.S. Pat. No. 4,910,979A, e.g., an inner basket being rotatably fixed, via a first shaft and a gearbox outer housing, to the ring gear of a planetary gearbox. An agitation device is rotatably fixed via a second shaft to the planet carrier inside the planetary gearbox. The rotor of a motor is rotatably connected via a belt transmission to a third coaxial shaft which is rotatably fixed to the sun gear of the planetary gearbox. In a wash mode the rotation of the sun gear by the motor causes rotation of the agitation device at a reduced speed with increased torque. Simultaneously the torque reaction of the planet gears against the ring gear causes the basket to rotate in the opposite direction to the agitation device. In spin mode, a mode switching mechanism engages a clutch which rotationally fixes the ring gear to the sun gear. In this mode there is no relative movement of the gears and the basket and agitation device and drive shaft all rotate together at the same speed.

Other drive systems are disclosed by U.S. Pat. Nos. 4,232,536A and 8,616,028B. In these systems a drive motor is mounted coaxially beneath a planetary gearbox. The rotor of the motor is permanently rotationally fixed via a third central shaft to a sun gear in the planetary gearbox. These systems eliminate the belt transmission components and some structural supports. Additionally, some vibration performance advantages can be gained from positioning the motor mass in line with the rotation axis.

While these coaxial motor systems do somewhat reduce the number of moving parts and transmission components, they require significant axial space below the drum to the detriment of wash volume.

A further drive system is disclosed by U.S. Pat. No. 7,475,445B (Haier) and a similar system is disclosed by CN102337653B (Julong). Both of these systems have the ability to actively rotate the basket in the opposing direction to the agitation device at a controlled speed to achieve better control of the wash action and improved wash performance. In these systems the planetary gearbox contains an additional gear set to drive the basket. In both systems it is necessary for the basket shaft to rotate independently of the outer casing of the gearbox in wash mode.

To allow this rotation the basket shaft must be connected to the gearbox casing by one or more bearings which are mounted in the top of the gearbox casing. Additionally at least one more bearing is required to allow the entire gearbox to rotate relative to the outer tub.

In high speed spin mode the basket shaft can be subjected to very high bending moments due to an unbalanced laundry load. Because of the limited space in the top of the gearbox, the basket shaft bearings are not able to be spaced a significant distance apart and therefore can be very highly stressed due to the reaction loads. Consequently the high forces acting on the bearings are a significant limitation to achieving higher spin speeds or tolerating larger out-of-balance masses.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

SUMMARY OF THE INVENTION

It is an object of the present invention to provide a motor and gearbox drive system for a washing machine, and/or a washing machine incorporating such drive system, which goes at least some way to overcoming the above disadvantages or which will at least provide the industry with a useful choice.

In a first broad aspect the invention provides a drive system according to the appended claims. In one embodiment this may be in the form of a drive system for use in a washing machine comprising: a motor with a stator and rotor; a gearbox comprising: an outer casing; a first gearbox output shaft for driving a basket of the washing machine; a second gearbox output shaft, coaxial with the first gearbox output shaft, for driving an agitation device; a gearbox input shaft, coaxial with the output shafts, driven by the rotor; a mount element rotationally fixed relative to the tub; an upper bearing for mounting the gearbox casing proximate a tub of the washing machine; a lower bearing located with the mount element for mounting the gearbox casing, to be rotatably mounted relative to the tub between the upper bearing and lower bearing; and a clutch, selectively operable to engage the gearbox in a first mode to connect the input shaft to drive at least the first output shaft without speed reduction, and in a second mode to drive the first output shaft at a controlled and reduced speed in a first direction while simultaneously driving the second output shaft at a second controlled and reduced speed in a direction opposing the first direction; wherein the first gearbox output shaft and the outer casing are permanently rotationally fixed together in first and second modes.

Preferably the gearbox has a planet carrier rotationally fixed to the second gearbox output shaft. Preferably the gearbox has a first ring gear connected to the first gearbox output shaft. Preferably the gearbox has a second ring gear connected to a clutch shaft. Preferably the gearbox has one or more planet gear clusters comprising a first planet gear and a second planet gear rotationally fixed together. Preferably the first planet gear engages with the first ring gear and the second planet gear engages with the second ring gear. Preferably the first ring gear has a PCD that is greater than the PCD of the second ring gear. Preferably the first planet gear has a PCD that is greater than the PCD of the second planet gear. Preferably the gearbox has a sun gear rotationally fixed to the input shaft. Preferably the sun gear engages with either the first or second planet gear.

Preferably one or more bearings rotatably connect the clutch shaft to the gearbox casing. Preferably one or more bearings allow the input shaft to rotate within the clutch shaft. Preferably the clutch is a sliding clutch, having an internal spline and the clutch shaft has an external spline and the sliding clutch is able to move axially relative to the clutch shaft but remains rotationally fixed therewith.

Preferably in the first mode the clutch is moved to an axially lower position on the clutch shaft where engagement features on the clutch engage with corresponding features on either the input shaft or a hub of the rotor thereby rotationally fixing the clutch shaft and second ring gear to the rotor. Preferably in the second mode the clutch is moved to an axially upper position on the clutch shaft where engagement features on the clutch engage with corresponding features of a rotationally fixed component, preferably of the stator or mount element, thereby preventing rotation of the clutch shaft and second ring gear. Preferably a bias means disposed about the clutch shaft biases the clutch to drive it downward to the first mode position. Preferably an arm linked to an actuator acts on the clutch to drive it upward against the bias to the second mode position.

Preferably the stator of the motor is fixed to the mount element.

In a second broad aspect, the invention provides a laundry washing machine comprising a basket within a tub and an agitation device within the tub, with the drive system as claimed in any one of the preceding claims mounted to the tub for driving the basket and the agitation device.

As used herein the term "and/or" means "and" or "or", or both. As used herein "(s)" following a noun means the plural and/or singular forms of the noun.

The term "comprising" as used in this specification and claims means "consisting at least in part of". When interpreting statements in this specification and claims which include that term, the features, prefaced by that term in each statement, all need to be present but other features can also be present. Related terms such as "comprise" and "comprised" are to be interpreted in the same manner.

The entire disclosures of all applications, patents and publications, cited above and below, if any, are hereby incorporated by reference.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth. For example, the terms 'tub', 'drum' etc. may have alternative expressions but refer to functionally equivalent components. For the purposes of interpretation all functionally equivalent expressions are deemed disclosed.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

Aspects of the invention will become apparent from the following description which is given by way of example only and with reference to the accompanying drawings, wherein.

DETAILED DESCRIPTION OF THE INVENTION

Figure 1:
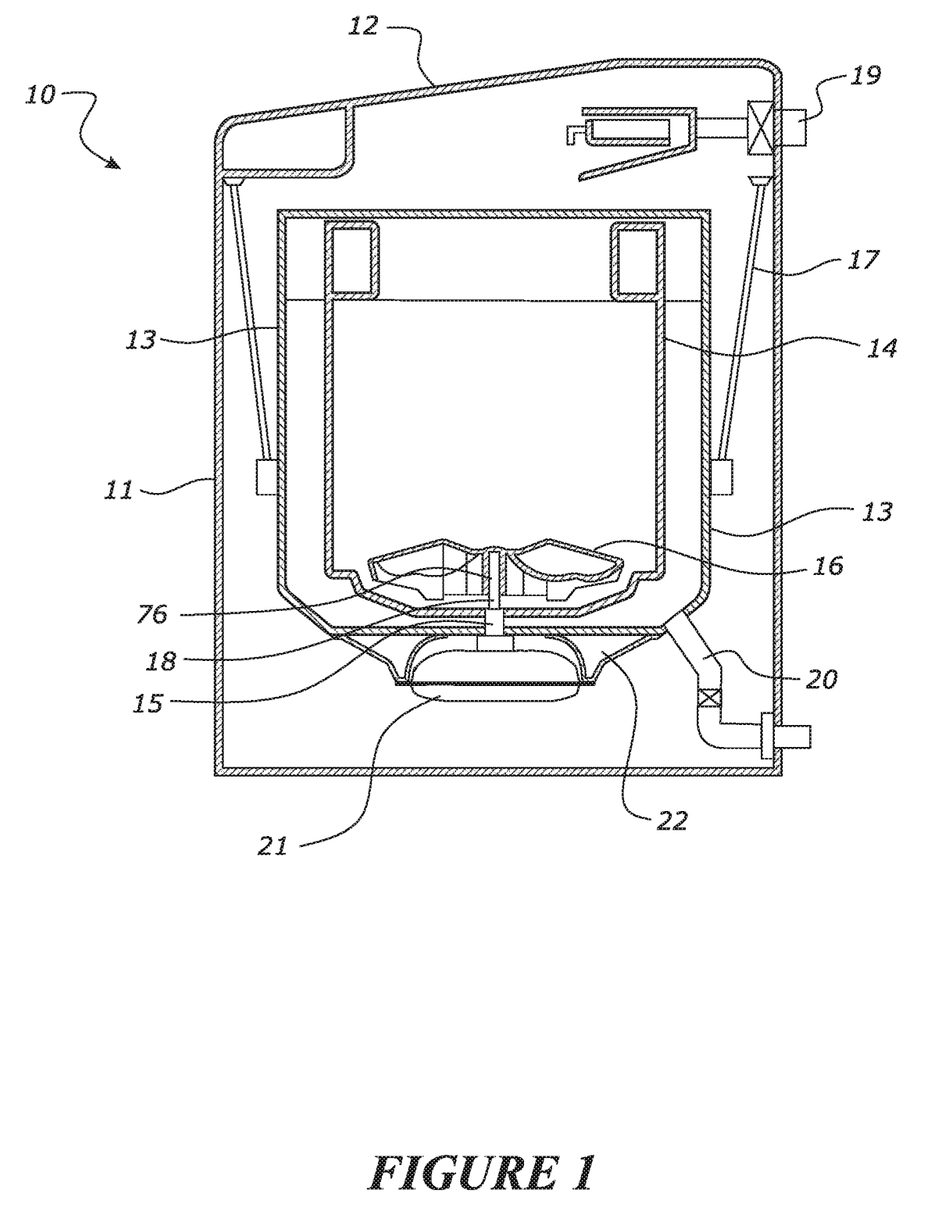
FIG. 1 illustrates a cross-sectional view of a full top-loading washing machine to show the context of an incorporated drive system according to an embodiment of the invention.

Referring to FIG. 1, a laundry washing machine 10 has an exterior housing 11 with a lid 12 for providing 'top-loading' user access to a tub (or water container) 13 suspended from interior walls of the housing, e.g. by support rods 17. A basket (or drum) 14 is rotatably mounted inside the tub 13 on a basket shaft 15. An agitation device 16 is rotatably mounted within the basket on an agitator shaft 18 which is co-axial but rotationally independent of the basket shaft 15. Water is supplied by an inlet 19, mixed with detergent in basket 14 and subsequently, e.g. after a wash cycle, drained by gravity or more likely pumped from tub 13 at a drain 20 leading to an exterior waste port.

The components outlined above are all known in the laundry machine art in various forms. For example, the tub 13 may be suspended from the upper edge of the cabinet, or supported from the lower edge of the cabinet, or integrated with the cabinet housing 11. User access may be directly from above as shown, or at least partially from in front, or by tilting or withdrawing some or all of the tub from the cabinet. The basket 14 may be a perforated drum, with or without integrally formed base and balance rings. The drum/basket may be formed of plastics materials, stainless steel, enameled steel or a combination thereof. The agitation device 16 may be in the form of an agitator post, a paddle, a wash plate, a pulsator, a nutating plate, a shallow bowl within the basket, or any other of the many arrangements that are known in the art which are driven by a shaft that rotates independently of the basket during at least part of a wash phase. Although a top-loading laundry washing machine is illustrated in FIG. 1, the invention is also relevant to front-loading (or "horizontal axis") laundry washing machines.

A drive system 21, according to embodiments described hereinafter with further reference to FIGS. 2 to 8, is supported by a mount so element/housing or mounting 22 on the underside of the tub 13.

Figure 2:
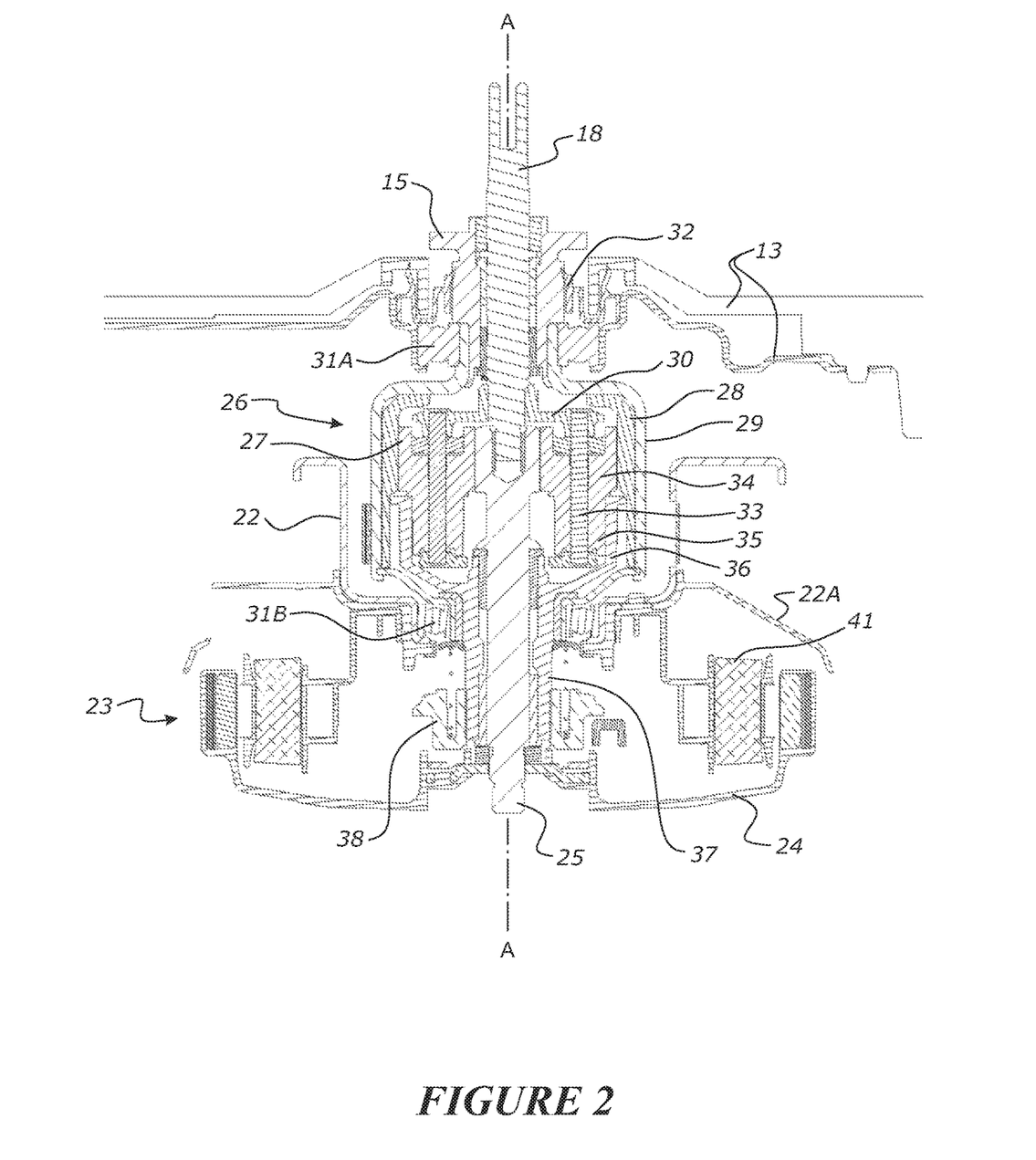
FIG. 2 illustrates a detailed cross-section view of a drive system according to an embodiment of the invention, relative to a washing machine tub.

The drive system 21, seen in more detail in FIG. 2, includes a motor section 23, which is the part of the drive system located outermost from tub 13, with a rotor 24, e.g. an external rotor, preferably rotatable about an axis A that is coaxial with the basket shaft 15 and agitation device shaft 18. The rotor 24 is rotationally locked with and drives an input shaft 25 thereby ultimately transmitting torque to the basket 14 and agitation device 16 via a gearbox 26 to operate the rotatable aspects of the washing machine's function. A stator 41 of the motor is fixed with mounting 22 and is rotationally stationary relative to the washing machine housing 11 and tub 13 while rotor 24, shaft 25, gearbox 26, basket 14 and agitator 16/18 are configured for various relative rotations about axis A. As known in the art, a suspension means may allow significant amounts of relative movement between the tub and the washing machine housing/cabinet.

According to a preferred operation, in a standard spin mode the basket 14 and agitation device 16/18 both spin at the same speed and in the same direction as the input shaft 25; whereas during a wash mode the gearbox preferably provides speed reduction and torque multiplication between the input shaft 25 and the agitation device 16/18. The illustrated configuration of the invention allows for a smaller motor 23 to be used than in a direct drive system where a motor would directly drive the agitation device in wash mode without a selectively acting gearbox.

Figure 3:
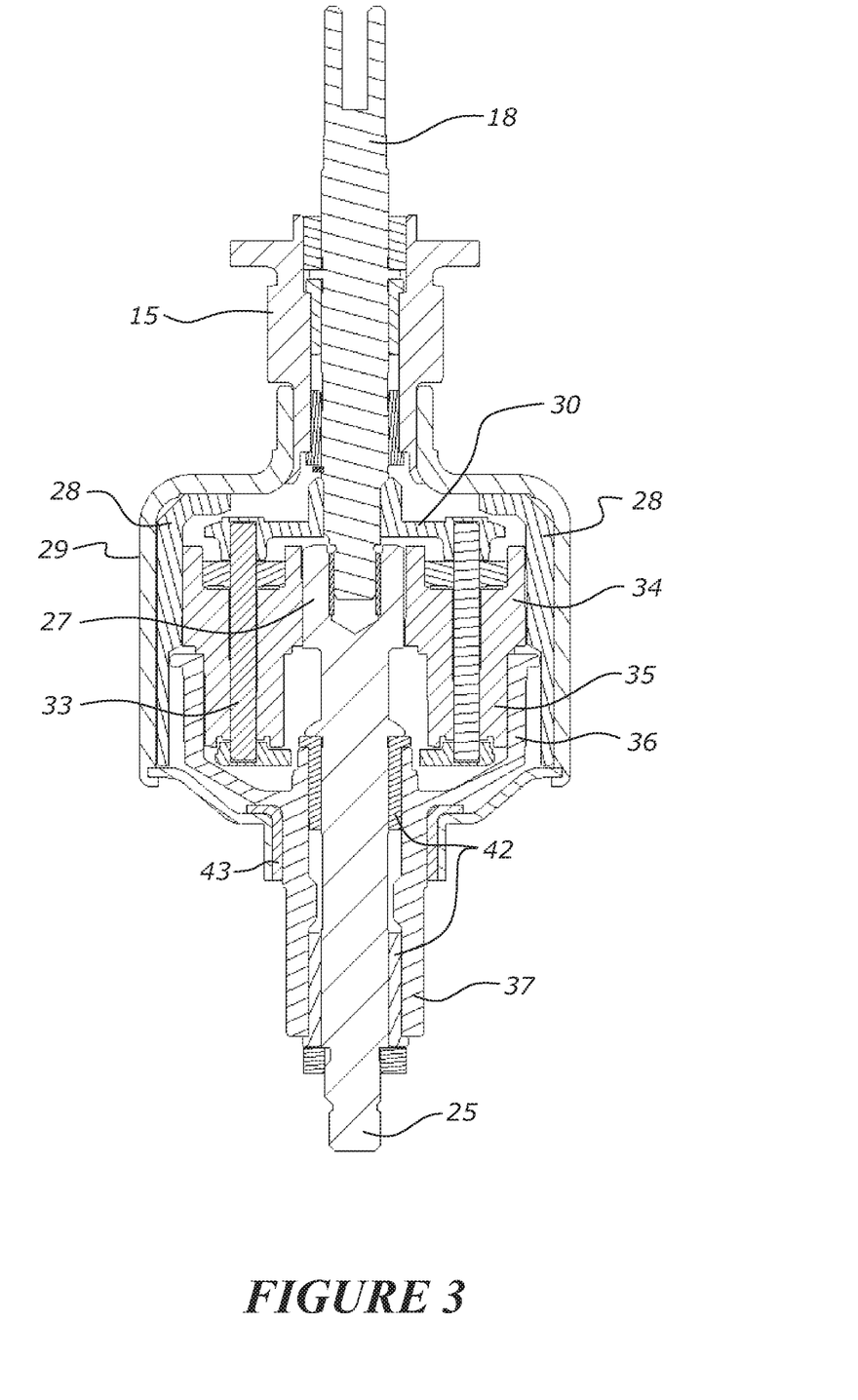
FIG. 3 illustrates a cross-sectional side view of a gearbox.
Figure 5:
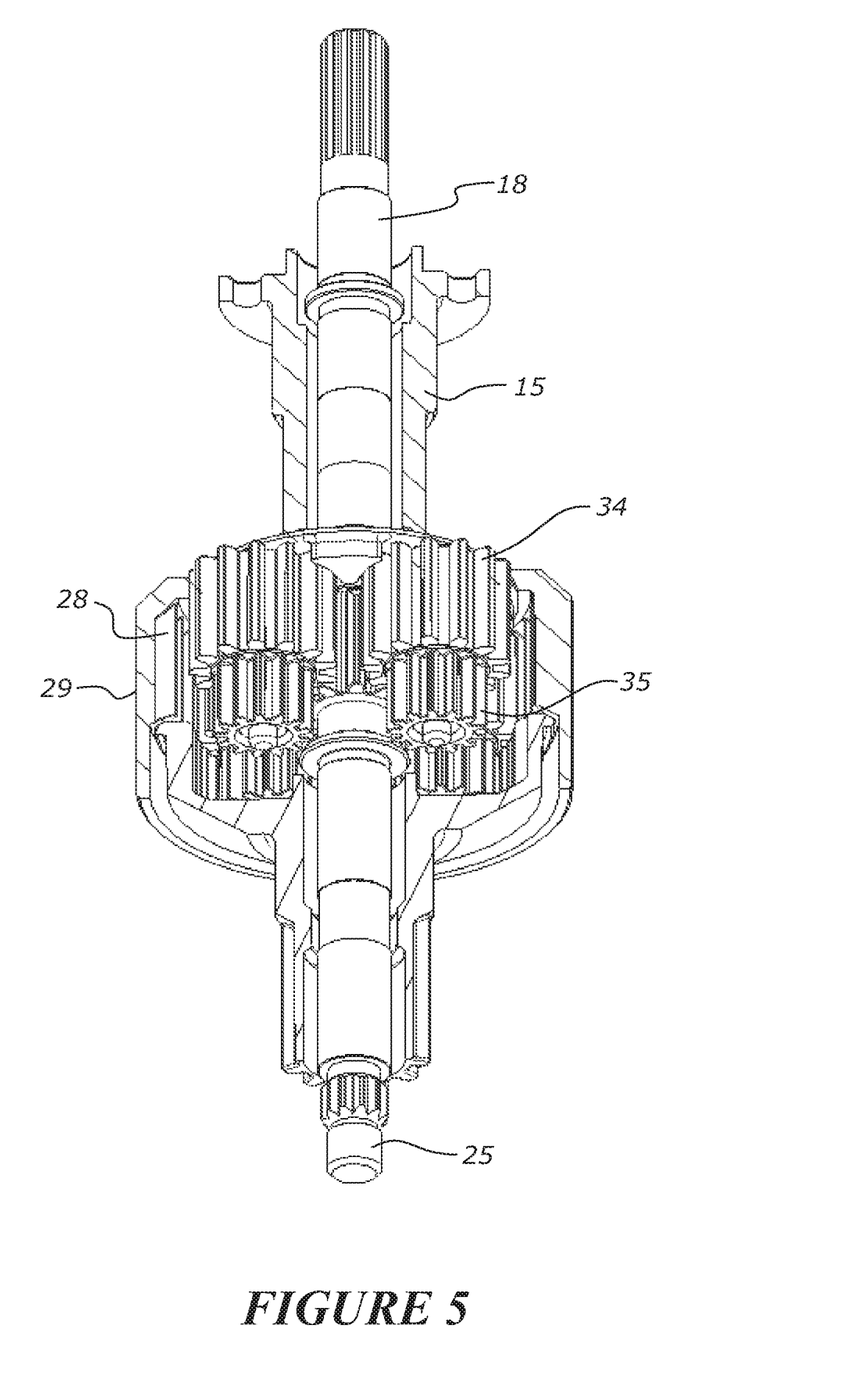
FIG. 5 illustrates a partial cross-sectional perspective view of the gearbox.
Figure 6:
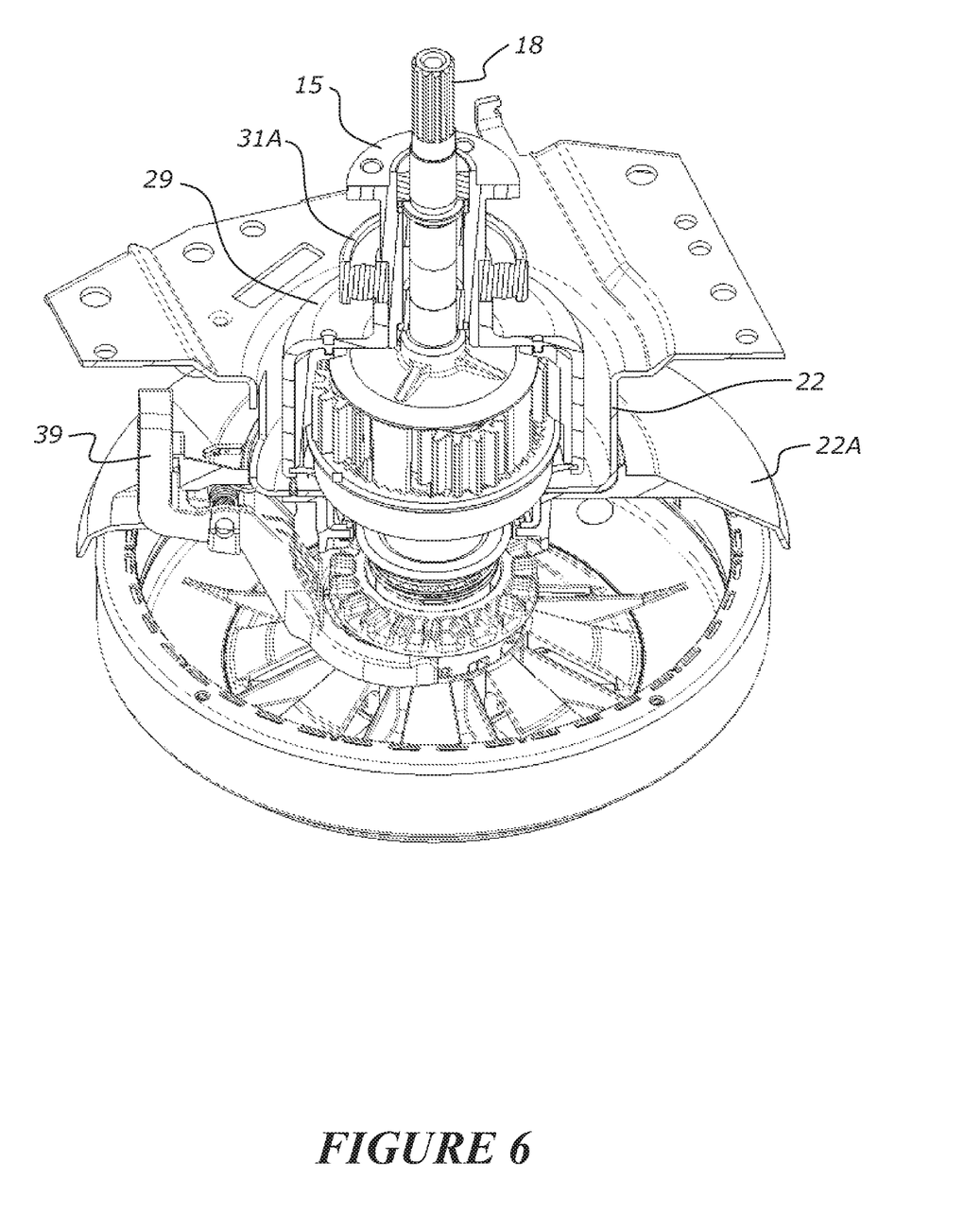
FIG. 6 illustrates a partial cross-sectional perspective view of the drive system according to an embodiment of the invention with the stator omitted for clarity.

As best illustrated by FIGS. 3 and 5, the gearbox 26 is of a planetary type. A sun gear 27 is rotationally fixed to the input shaft 25 upon the central axis A. A first ring gear 28 is permanently rotationally fixed to the basket shaft 15 and also to the gearbox housing 29. In principle these components could be integrated. Meanwhile, a planet carrier 30 is permanently rotationally fixed to the agitation device shaft 18. Therefore, the internal planetary components of the gearbox 26 move with the agitation device 16/18 but are able to move independently of the outer ring gear/housing 28/29 and basket 14/15.

Gearbox housing 29 is rotationally mounted from the underside of tub 13 between a pair of bearings 31A and 31B that allows gearbox 26 to rotate about axis A while the substantive washing machine housing 11, mounting 22 and tub 13 are static. An upper bearing 31A is seated into an opening in an upper housing/mounting structure underneath the tub 13 while a lower bearing 31B is seated into a pressed metal lower housing part, generally denoted as mounting 22, proximate stator 41 which is fixed to the outside thereof. Reference numeral 22A denotes a plastic cover part proximate the motor. An annular seal 32 about basket shaft 15 partitions a wet side of the tub 13 from upper bearing 31A and drive system 21 underneath.

During operation of the gearbox 26 one or more planet gear clusters rotate on one or more shafts 33 of the planet gear carrier. Each planet gear cluster comprises a first planet gear 34 and a second planet gear 35, of differing diameters but rotationally fixed together. The first planet gear 34 engages with the first ring gear 28 and second planet gear 35 engages with a second ring gear 36. One of the first 34 and the second 35 planet gears also engages with the sun gear 27 and input shaft 25. In the illustrated form it is the first planet gear 34 that engages with sun gear 27.

Figure 4:
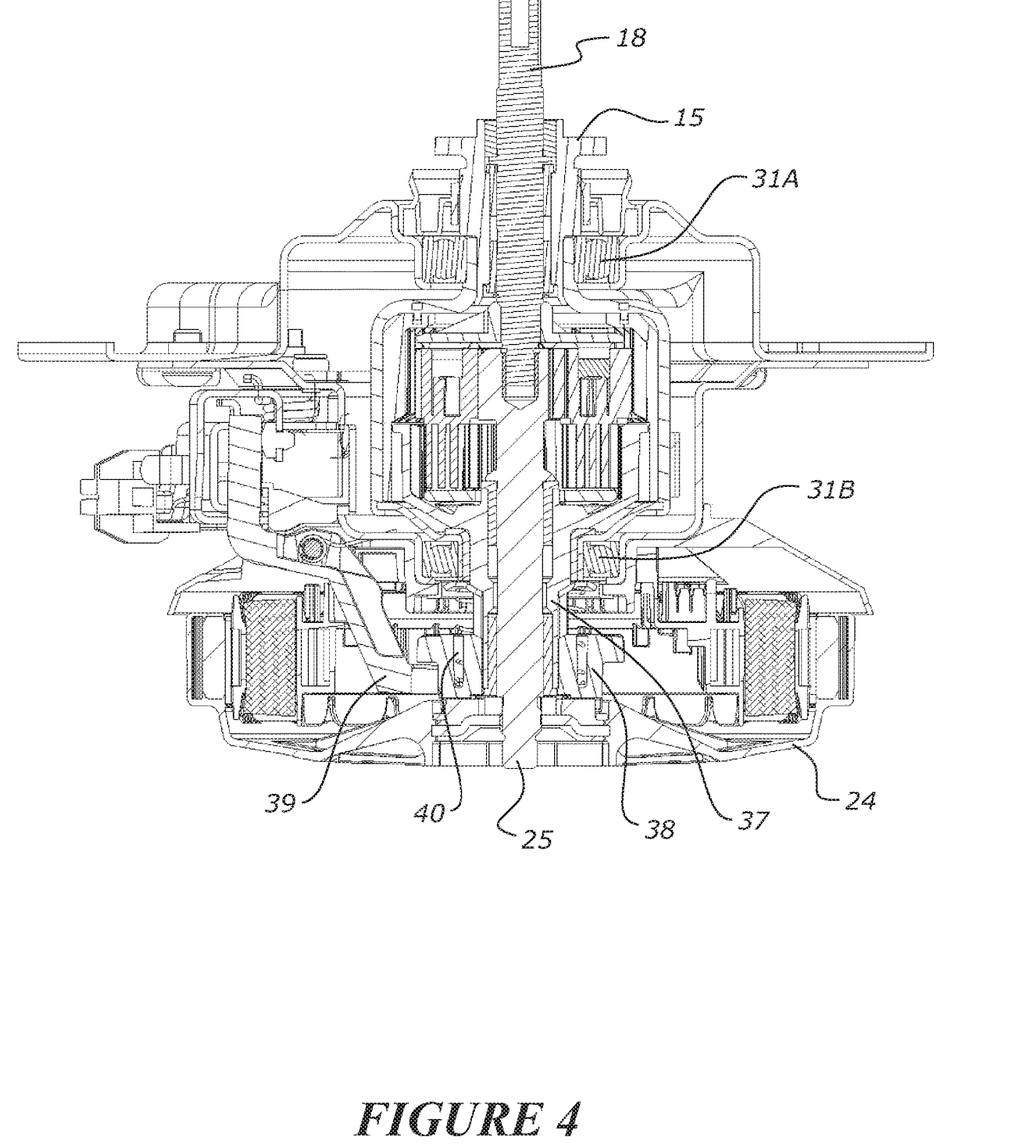
FIG. 4 illustrates a further cross-sectional side view of a clutch location for the gearbox relative to a motor.
Figure 7:
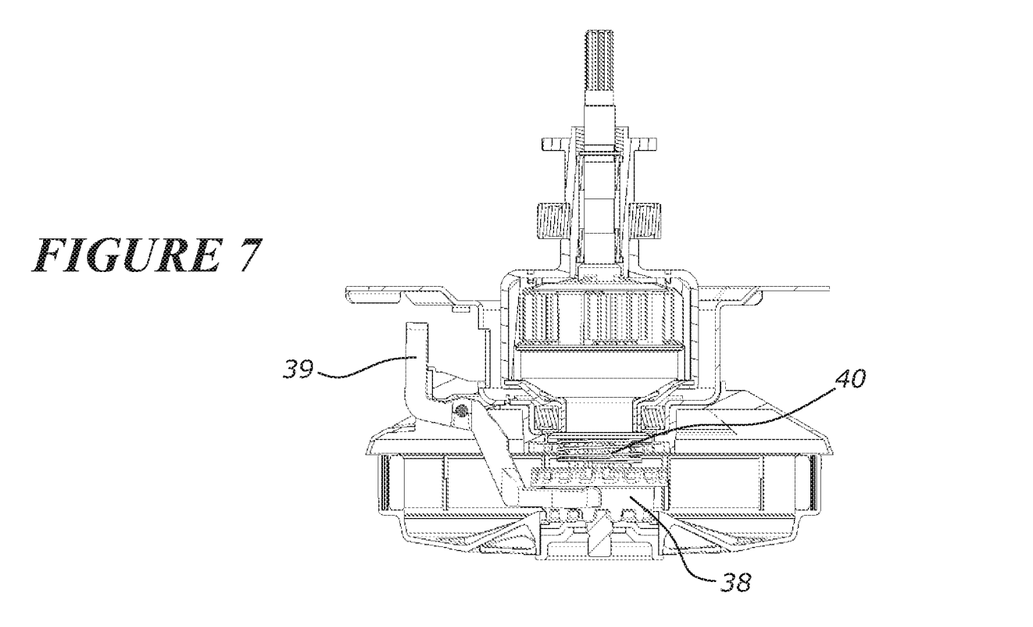
FIG. 7 illustrates a cross-sectional side view of the drive system of FIG. 6 configured for spin mode.
Figure 8:
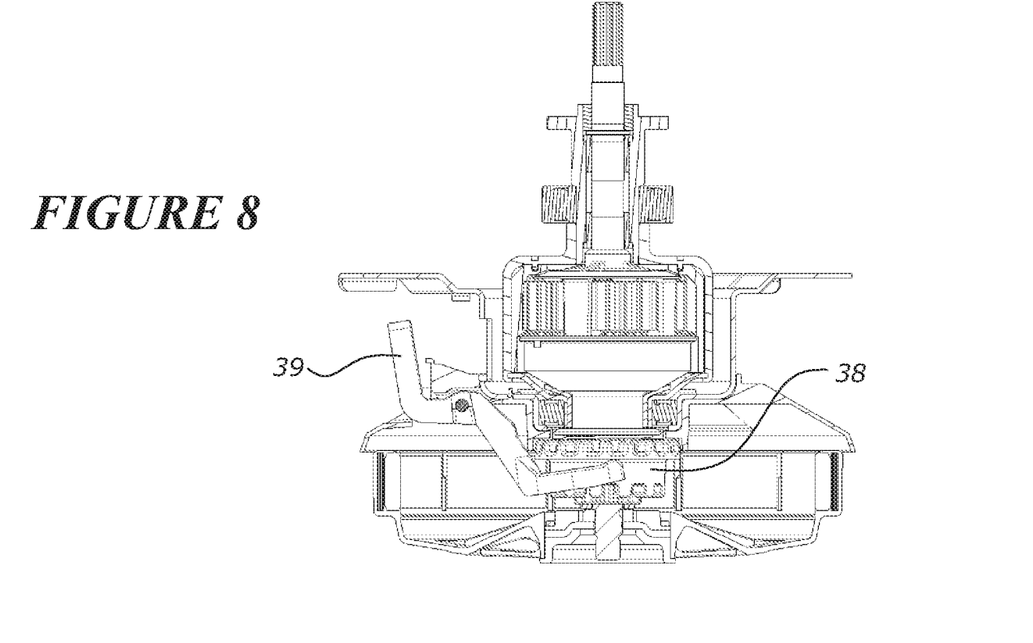
FIG. 8 illustrates a cross-section side view of the drive system of FIG. 6 configured for wash mode.

In the illustrated form the second ring gear 36 is rotationally fixed with a clutch shaft 37 which has outer splines for rotationally but not axially fixing to a sliding clutch 38 (FIGS. 4, 7 and 8). One or more (preferably two) annular bearings (such as plain bearings or bushes) 42 allow the input shaft 25 to rotate within and relative to the clutch shaft 37. Preferably there is also an annular bearing/bush 43 between the clutch shaft 37 and gearbox housing 29, as seen in FIG. 3, enabling a rotatable relative connection therebetween.

The sliding clutch 38 can be moved between a lower position (spatially at a position furthest away from tub 13 as illustrated by FIG. 7) associated with a spin mode where it rotationally locks the clutch shaft 37 and second ring gear 36 to the rotor 24 and/or input shaft 25, and an upper position (spatially closer to tub 13 as illustrated by FIG. 8) associated with a wash mode where the clutch shaft 37 and rotor 24 are not locked but the clutch shaft 37 and second ring gear 36 rotationally lock to the stationary lower housing part or mounting 22. In wash mode the first ring gear 28 and outer housing 29, rotationally fixed to basket shaft 15, drive basket 14 in the opposite rotational direction to the agitator shaft 18 being driven by the planetary gears.

The proximal end of a non-rotating shifter arm 39 is arranged to move clutch 38 axially. The proximal shifter arm end may be bifurcated with two clutch contacting surfaces arranged to engage a lower surface of clutch 38, on opposite sides of the drive's rotational axis. The shifter arm is pivotally connected to mounting 22 or the tub so that when its distal end is moved away from the gearbox by an actuator (not shown), the shifter arm rotates anti-clockwise (as shown in the drawing figures) about a pivot point. The proximal end of the shifter arm is thus driven upward to push the clutch 38 upward against the biasing force of a clutch spring 40 to its upper, wash mode, position. Engagement features such as teeth (best seen in FIG. 6) in an axially upper surface of clutch 38 may then engage with corresponding features on mounting 22.

The actuator may alternatively move the distal end of the shifter arm towards the gearbox (rotating clockwise about the pivot point) so that the proximal shifter arm end is driven downward thereby allowing the clutch spring bias to push the clutch downward to its lower, spin mode, position. In this position, engagement features such as teeth in an axially lower surface of clutch 38 (as best seen in FIGS. 7 and 8) may then engage with corresponding surface features of rotor 24.

In a preferred embodiment as illustrated, the pitch circle diameter (PCD) of the second ring gear 36 is slightly smaller than the PCD of the first ring gear 28 and the PCD of the second planet gear 35 is slightly smaller than the PCD of the first planet gear 34. In wash mode the second ring gear 36 is held stationary by the clutch 38 and the second planet gear 35 causes the first planet gear 34 to rotate the first ring gear 29 and first output shaft 15 such that it is actively driven or controlled in an opposing rotational direction to the input shaft 25 and sun gear 27 at a first reduced rotational speed, relative to the input shaft. In addition, planet carrier 30 and second output shaft are rotated in the same rotational direction as the input shaft 25 and sun gear and actively driven or controlled at a second reduced rotational speed, relative to the input shaft.

In a preferred form the reduction ratio of agitation device shaft 18 to the input shaft 25 in wash mode may be approximately 4 to 1. Preferably, the reduction ratio of basket shaft 15 to the input shaft 25 may be approximately 16 to 1 in the opposing rotational direction.

The invention claimed is:
1. A drive system for use in a washing machine comprising:
    a motor with a stator and rotor;
    a gearbox comprising:
        an outer casing;

a first gearbox output shaft for driving a basket of the washing machine;
a second gearbox output shaft, coaxial with the first gearbox output shaft, for driving an agitation device; and
a gearbox input shaft, coaxial with the output shafts, driven by the rotor;
a mount element rotationally fixed relative to a tub of the washing machine;
an upper bearing for mounting the gearbox outer casing proximate the tub;
a lower bearing located with the mount element, the gearbox outer casing rotatably mounted relative to the tub between the upper bearing and lower bearing; and
a clutch, selectively operable to engage the gearbox in a first mode to connect the gearbox input shaft to drive at least the first output shaft without speed reduction, and in a second mode to actively drive the first output shaft at a first reduced speed in a first rotational direction while simultaneously actively driving the second output shaft at a second reduced speed in a direction opposing the first rotational direction; wherein
the first gearbox output shaft and the outer casing are rotationally fixed together in the first and second modes.

2. The drive system as claimed in claim 1, wherein the gearbox has a planet carrier rotationally fixed to the second gearbox output shaft.

3. The drive system as claimed in claim 1, wherein the gearbox has a ring gear connected to the first gearbox output shaft.

4. The drive system as claimed in claim 1, wherein the gearbox has a ring gear connected to a clutch shaft.

5. The drive system as claimed in claim 4, wherein a first ring gear connected to the first gearbox output shaft has a PCD that is greater than the PCD of a second ring gear connected to the clutch shaft.

6. The drive system as claimed in claim 4, wherein one or more bearings rotatably connect the clutch shaft to the gearbox casing.

7. The drive system as claimed in claim 6, wherein in the first mode the clutch is moved to a first mode position on the clutch shaft where engagement features on the clutch engage with corresponding features on either the gearbox input shaft or a hub of the rotor thereby rotationally fixing the clutch shaft and the second ring gear to the rotor.

8. The drive system as claimed in claim 7, wherein a biasing means disposed about the clutch shaft biases the clutch to urge it towards the first mode position.

9. The drive system as claimed in claim 6, wherein in the second mode the clutch is moved to a second mode position on the clutch shaft where engagement features on the clutch engage with corresponding features of a rotationally fixed component, preferably of the stator or mount element, thereby preventing rotation of the clutch shaft and the second ring gear relative thereto.

10. The drive system as claimed in claim 9, wherein an arm linked to an actuator acts on the clutch to urge it towards the second mode position.

11. The drive system as claimed claim 4, wherein one or more bearings allow the gearbox input shaft to rotate within the clutch shaft.

12. The drive system as claimed in claim 4, wherein the clutch is a sliding clutch, having an internal spline and the clutch shaft has an external spline and the sliding clutch is able to move axially relative to the clutch shaft but remains rotationally fixed therewith.

13. The drive system as claimed in claim 1, wherein the gearbox has one or more planet gear clusters comprising a first planet gear and a second planet gear rotationally fixed together.

14. The drive system as claimed in claim 13, wherein the first planet gear engages with a first ring gear connected to the first gearbox output shaft and the second planet gear engages with a second ring gear connected to a clutch shaft.

15. The drive system as claimed in claim 13, wherein the first planet gear has a PCD that is greater than the PCD of the second planet gear.

16. The drive system as claimed in claim 13, wherein the gearbox has a sun gear rotationally fixed to the gearbox input shaft.

17. The drive system as claimed in claim 16, wherein the sun gear engages with either the first or second planet gear.

18. The drive system as claimed in claim 1, wherein the stator of the motor is fixed to the mount element.

19. A laundry washing machine comprising:
a basket within a tub and an agitation device within the tub,
with a drive system mounted to the tub for driving the basket
and the agitation device, the drive system comprising:
a motor with a stator and rotor;
a gearbox comprising;
an outer casing;
a first gearbox output shaft for driving the basket;
a second gearbox output shaft, coaxial with the first gearbox output shaft, for driving the agitation device; and
a gearbox input shaft, coaxial with the output shafts, driven by the rotor;
a mount element rotationally fixed relative to the tub of the washing machine;
an upper bearing for mounting the gearbox outer casing proximate the tub;
a lower bearing located with the mount element, the gearbox outer casing rotatably mounted relative to the tub between the upper bearing and lower bearing; and
a clutch, selectively operable to engage the gearbox in a first mode to connect the gearbox input shaft to drive at least the first output shaft without speed reduction, and in a second mode to actively drive the first output shaft at a first reduced speed in a first rotational direction while simultaneously actively driving the second output shaft at a second reduced speed in a direction opposing the first rotational direction; wherein
the first gearbox output shaft and the outer casing are rotationally fixed together in the first and second modes.

* * * * *